United States Patent
Carroni et al.

(10) Patent No.: US 8,584,465 B2
(45) Date of Patent: Nov. 19, 2013

(54) METHOD FOR INCREASING THE EFFICIENCY OF A POWER PLANT WHICH IS EQUIPPED WITH A GAS TURBINE, AND POWER PLANT FOR CARRYING OUT THE METHOD

(71) Applicant: ALSTOM Technology Ltd., Baden (CH)

(72) Inventors: Richard Carroni, Niederrohrdorf (CH); Burkhard Josuhn-Kadner, Schopfheim (DE)

(73) Assignee: Alstom Technology Ltd. (CH)

( * ) Notice: Subject to any disclaimer, the term of this patent is extended or adjusted under 35 U.S.C. 154(b) by 0 days.

(21) Appl. No.: 13/632,207

(22) Filed: Oct. 1, 2012

(65) Prior Publication Data
US 2013/0042621 A1 Feb. 21, 2013

Related U.S. Application Data

(63) Continuation of application No. PCT/EP2011/054766, filed on Mar. 29, 2011.

(30) Foreign Application Priority Data
Apr. 1, 2010 (CH) ........................... 0477/10

(51) Int. Cl.
*F02C 7/08* (2006.01)
(52) U.S. Cl.
USPC .............................................. 60/736
(58) Field of Classification Search
USPC ............. 60/203.1, 780, 781, 39.461, 39.464, 60/736; 145/48.2
See application file for complete search history.

(56) References Cited

U.S. PATENT DOCUMENTS

| | | | | |
|---|---|---|---|---|
| 4,229,184 A | * | 10/1980 | Gregg | 48/62 R |
| 4,258,698 A | * | 3/1981 | Sales | 126/700 |
| 6,233,914 B1 | | 5/2001 | Fisher | |
| 2002/0148213 A1 | * | 10/2002 | Yu | 60/39.17 |
| 2006/0266039 A1 | * | 11/2006 | Skowronski et al. | 60/641.8 |
| 2008/0127647 A1 | * | 6/2008 | Leitner | 60/645 |
| 2010/0024432 A1 | * | 2/2010 | Pfefferle | 60/780 |
| 2010/0065045 A1 | * | 3/2010 | Jennings | 126/694 |
| 2010/0154781 A1 | * | 6/2010 | Zhang et al. | 126/609 |
| 2011/0088404 A1 | * | 4/2011 | Gulen | 60/772 |

FOREIGN PATENT DOCUMENTS

| | | |
|---|---|---|
| DE | 19512466 C1 | 8/1996 |
| EP | 0095555 A2 | 12/1983 |
| EP | 0903484 A2 | 3/1999 |
| GB | 2449181 A | 11/2008 |
| WO | 0065213 A1 | 11/2000 |

OTHER PUBLICATIONS

Swiss Search Report and Written Opinion for Swiss Patent Application No. 00477/10; Date of Mailing May 28, 2010.

(Continued)

Primary Examiner — Phutthiwat Wongwian
(74) Attorney, Agent, or Firm — Cantor Colburn LLP

(57) ABSTRACT

In a power plant which is equipped with a gas turbine, fuel for the gas turbine is preheated by means of solar heat. The preheating is realized through the use of a heat transfer circuit. The use of an additional, second heat transfer circuit between the source for the solar heat and the first heat transfer circuit permits storage of the solar heat. The fuel preheating according to the invention permits in particular an increase in the efficiency of the power plant.

12 Claims, 2 Drawing Sheets

(56) References Cited

OTHER PUBLICATIONS

Hong, et al., Solar thermal power cycle with integration of methanol decomposition and middle-temperature solar thermal energy, available [online] Aug. 23, 2004 at www.sciencedirect.com, pp. 49-58, copyright 2004 Elsevier Ltd. (Cited in CH Search Report and Written Opinion).

* cited by examiner

METHOD FOR INCREASING THE EFFICIENCY OF A POWER PLANT WHICH IS EQUIPPED WITH A GAS TURBINE, AND POWER PLANT FOR CARRYING OUT THE METHOD

CROSS REFERENCE TO RELATED APPLICATION

This application is a continuation application of International Application PCT/EP2011/054766, filed Mar. 3, 2011, which claims priority to Patent Application No. 00477/10 filed in Switzerland on Apr. 1, 2010, the disclosures of which are incorporated by reference herein in their entirety.

BACKGROUND OF THE INVENTION

1. Field of the Invention

The present invention relates to the field of power plant technology. It relates to a method for increasing the efficiency of a power plant which is equipped with a gas turbine, and in particular to a method for preheating fuel. The invention also relates to a power plant for carrying out the method.

2. Description of the Related Art

By increasing the fuel temperature in a gas turbine, it is possible for the distribution of the fuel-air mixture in the burners of the gas turbine to be improved, which leads to a reduction in NOx emissions. What is more important is that, in the case of a combined cycle power plant (CCPP), the overall efficiency of the gas turbine and thus also of the combined cycle plant can be improved if the fuel preheating is integrated into the water/steam circuit of the combined cycle plant. In the case of a combined cycle plant of type KA26-1 (with gas turbines of type GT26) from the Applicant, at full load, the difference between the non-preheated fuel at 15° C. and the fuel preheated to >100° C. leads to an increase in the efficiency of the combined cycle plant with a small drop in output power. The drop in output power arises from the fact that the hot water for preheating the fuel is extracted from the water/steam circuit.

At present, natural gas as fuel is preheated to >100° C. The maximum temperature is determined primarily by the capability of the components of the fuel system to withstand higher temperatures, for example at the controlling valves with non-metallic seals. It is however sought to further increase the fuel temperature.

The preheating of the fuel is basically known from the prior art. For example, the teaching of EP 0 095 555 concerns preheating and/or evaporating the fuel in oil burners in order to improve the combustion process. U.S. Pat. No. 6,233,914 discloses a method for the thermal pretreatment of a fuel in which solar steam is injected, for reformation, into the fuel. It is known from EP 0 903 484 to preheat the fuel in a heat exchanger by means of hot gas from the gas turbine plant. U.S. Pat. No. 6,269,626 or DE19512466 present similar systems for combined cycle power plants.

Furthermore, in GB2449181 it is proposed to use solar heat for the purpose of heating the combustion air in combined cycle power plants.

Even though such technologies have been proven, some disadvantages remain:

Normally, high-value heat at temperatures of up to >200° C. is used for preheating the fuel. Said heat could however be more effectively used in the steam turbine for increasing the performance and efficiency of the plant.

If the gas turbine is operated only independently in a single circuit, no heat for preheating the fuel is available from the water/steam circuit.

BRIEF SUMMARY OF THE INVENTION

It is an object of the present invention to provide a method for increasing the efficiency of a power plant which is equipped with a gas turbine, which method eliminates the disadvantages of known methods and can in particular also be used in the case of gas turbines in a single circuit, and also to specify a power plant for carrying out the method.

The object is achieved by means of the features of the independent claims in their entirety. It is essential to the invention that solar heat is used for preheating the fuel.

A method according to the invention is characterized in that the solar heat is generated in a solar array and is transferred by means of a first heat exchanger and a first heat transfer medium to the fuel which is supplied to the gas turbine.

In one embodiment of the method, it is additionally provided that the solar heat is transferred from the solar array to the first heat transfer medium by means of an intermediate circuit. For this purpose, the solar heat is firstly transferred, in an intermediate circuit which is connected between the solar array and the first heat exchanger, in a second heat exchanger to a second heat transfer medium. By means of the second heat transfer medium, the solar heat is then transferred in the first heat exchanger to the first heat transfer medium. This method by means of an intermediate circuit opens up possibilities in particular for storing solar heat for preheating the fuel during hours with reduced solar radiation.

In one embodiment of the method, for the transfer of the solar heat to the fuel, hot water is generated by means of the solar heat.

In a further embodiment, for the transfer of the solar heat to the fuel, steam is generated by means of the solar heat.

In a further embodiment of the method, for the transfer of the solar heat to the fuel, an oil is heated.

Natural gas is preferably used as fuel, wherein the natural gas is preheated to over 50° C. by means of the solar heat.

It is even more expedient with regard to the efficiency of the power plant and/or the NOx emissions if the natural gas is preheated to over 150° C. by means of the solar heat.

The power plant according to the invention comprises a gas turbine with a compressor for compressing combustion air, a combustion chamber in which hot gas is generated by the combustion of a fuel by means of the compressed combustion air, a turbine in which the hot gas generated is expanded, performing work, and means for preheating the fuel which is supplied to the combustion chamber, wherein the preheating means are connected to a source for solar heat.

In one embodiment of the invention, the source for the solar heat is a solar array, which in particular comprises collectors. Such collectors may for example comprise parabolic trough collectors, Fresnel elements or a heliostat installation.

In a further embodiment of the invention, the source for the solar heat is a planar solar plant such as for example a solar plant arranged on the roof of a house or on a similar suitable surface. These are suitable in particular for inexpensively heating the heat transfer medium, for example water, to up to 130° C.

The source for the solar heat may however also comprise a heat store for solar heat. This is the case in particular if it is sought to realize the preheating of fuel also at night or during hours with little sunlight.

One embodiment of the power plant according to the invention as per the independent claim is characterized in that the heat transfer means comprise a first heat exchanger which is connected into a fuel feed line and through which, at the primary side, there flows a medium which transports solar heat.

Here, the medium which transports solar heat is in particular water or steam or an oil.

An intermediate circuit with a second heat exchanger may preferably be arranged between the solar heat source and the first heat exchanger. Said second heat exchanger may in particular be used for storing heat in order to ensure preheating of the fuel during hours with little or no sunlight.

A further embodiment is characterized in that the gas turbine is in the form of a sequential-combustion gas turbine with two combustion chambers and two turbines, and in that the fuel for both combustion chambers is preheated by means of solar heat.

In particular, the gas turbine may be part of a combined cycle power plant which comprises a water/steam circuit.

BRIEF DESCRIPTION OF THE DRAWINGS

The invention shall be explained in more detail below on the basis of exemplary embodiments and in conjunction with the drawing, in which.

DETAILED DESCRIPTION OF THE INVENTION

Within the context of the present invention, it is proposed that the fuel for a gas turbine be preheated by means of solar heat, regardless of whether the gas turbine is operated independently or is part of a combined cycle power plant with a water/steam circuit. The solar heat is derived from a suitable solar thermal plant which selectively generates hot water or steam. The free solar heat which is then available is transferred in a heat exchanger to the fuel to be preheated. The efficiency of the plant can thereby be increased by over 0.6% without a reduction in output power. Even greater advantages are attained if the fuel is preheated for example to temperatures of >150° C., ideally to up to 250° C., by means of the solar heat.

Figure 1:
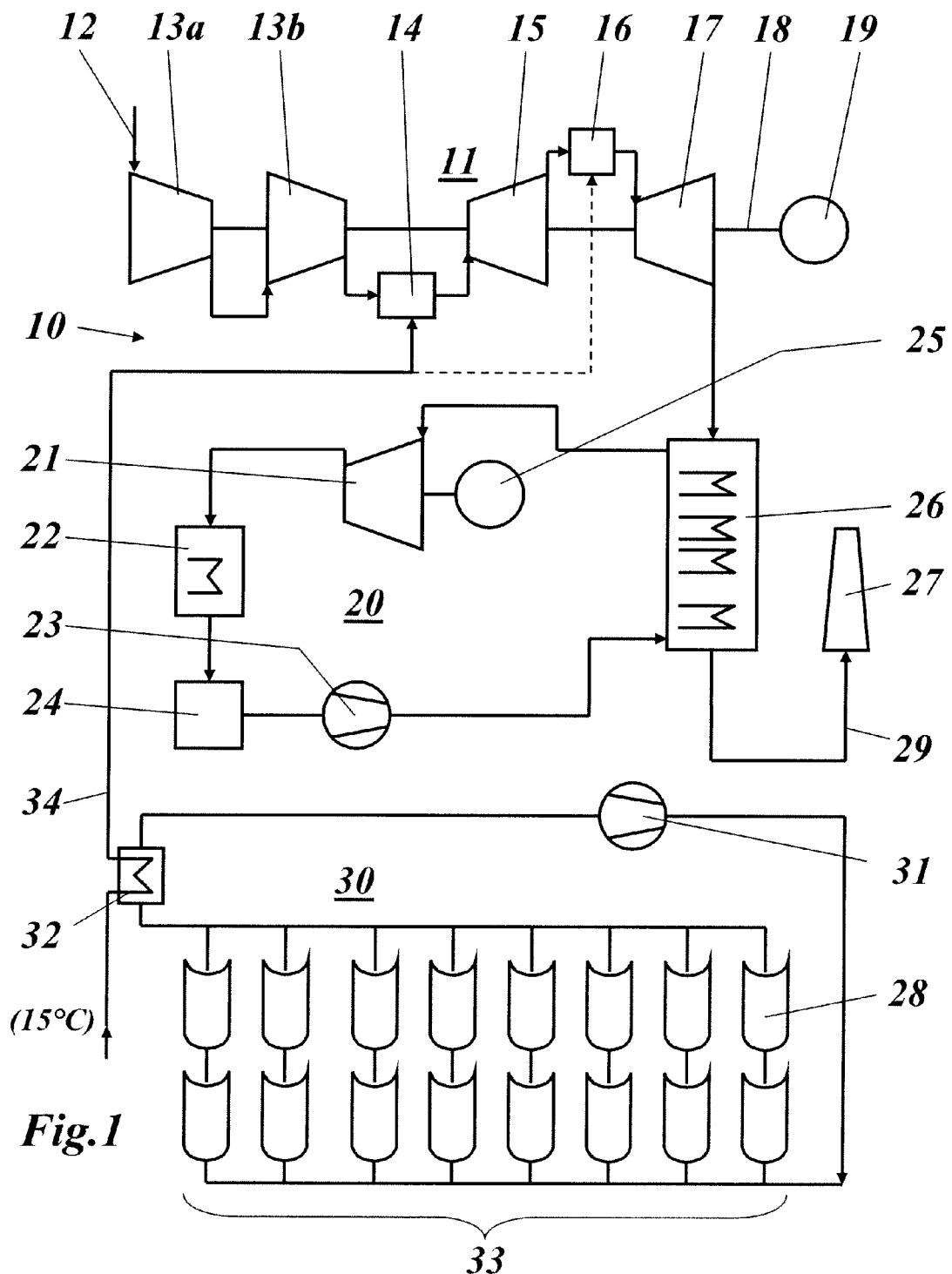
FIG. 1 schematically shows the basic layout of a combined cycle power plant with fuel preheating by means of a solar array, according to one exemplary embodiment of the invention.

FIG. 1 shows a highly simplified plant layout of a combined cycle power plant according to one exemplary embodiment of the invention. The combined cycle power plant 10 with solar preheating of the fuel shown in FIG. 1 comprises a gas turbine 11, a water/steam circuit 20 with a sequential-combustion steam turbine 21, and a solar circuit 30 with a solar array 33. In the present example, the steam turbine 11 is composed of two compressors 13a, 13b which are connected in series and which compress combustion air drawn in via an air inlet 12 and output said combustion air to a first combustion chamber 14 for the combustion of a fuel. The hot gas which is generated is expanded in a first turbine 15, performing work, is heated once again in a second combustion chamber 16 and is conducted through a second turbine 17. The compressors 13a, 13b and turbines 15, 17 are connected via a shaft 18 to a generator 19.

The waste gas which emerges from the second turbine 17 and which is still hot is conducted through a heat recovery steam generator (HRSG) 26, where it generates steam for the water/steam circuit 20 into which the heat recovery steam generator 26 is connected. After flowing through the heat recovery steam generator 26, the waste gas passes via a waste gas line 29 and through a waste gas chimney 27 into the environment.

The water/steam circuit 20 is formed basically from the steam turbine 21 connected to a generator 25, a condenser 22, a feed water boiler 24, a feed water pump 23 and the heat recovery steam generator 26.

Figure 2:
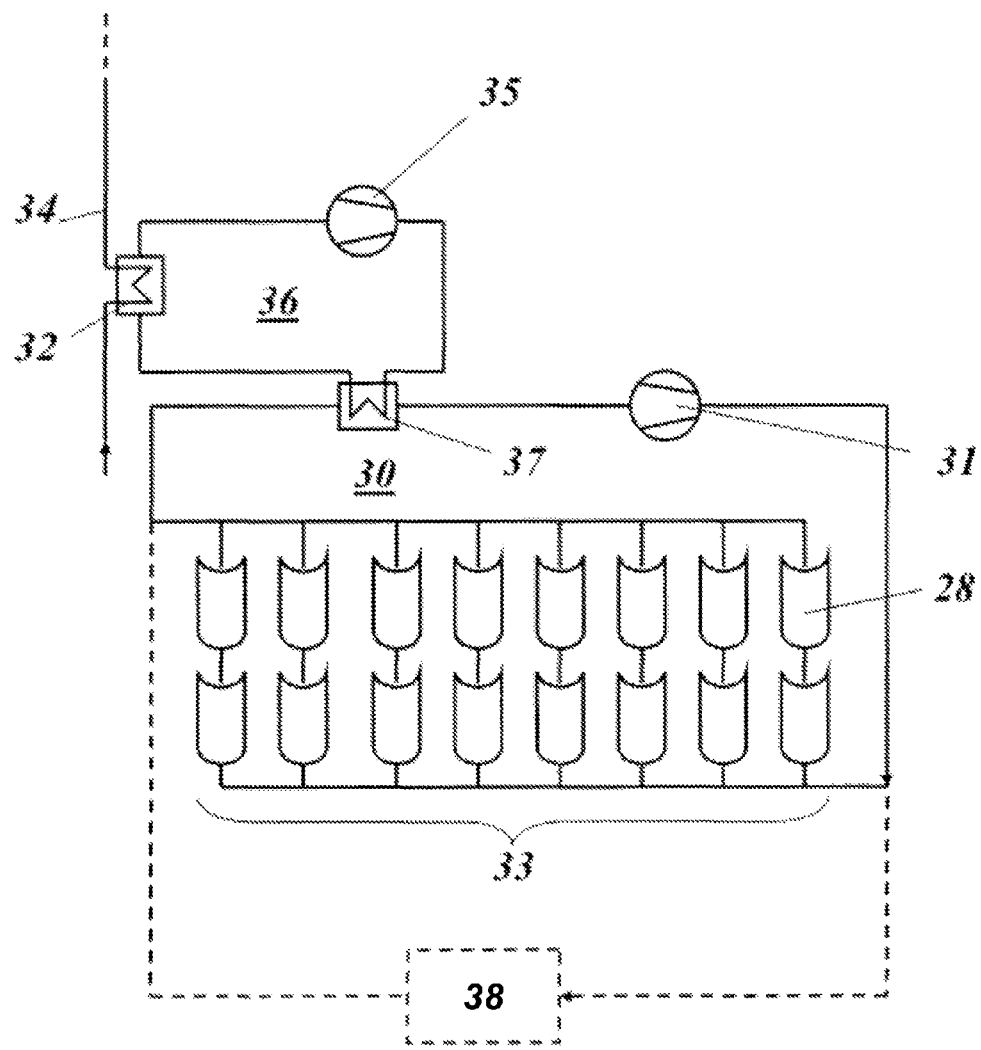
FIG. 2 shows an embodiment of that plant part from FIG. 1 which is responsible for the solar preheating of fuel.

A fuel line 34 for the gaseous fuel, for example natural gas, at a temperature of for example 15° C. leads to a heat exchanger 32, and from there to a combustion chamber 14, or two combustion chambers 14, 16 in the case of sequential combustion. Via the heat exchangers 32, heat energy from the solar circuit 30 is supplied to the fuel for the purpose of preheating, said heat energy having been formed by means of the solar array 33, a plurality of parabolic trough collectors 28, a pump 31 and the primary side of the heat exchanger 32. It is self-evidently possible for the solar circuit 30 to additionally be assigned storage means (heat store 38 in FIG. 2) for storing the solar heat for operation at times with little or no sunlight (for example at night). It is likewise conceivable, instead of the parabolic trough collectors 28, to use collectors equipped with Fresnel elements, such as for example Fresnel mirrors, or Heliostat installations, for example with a solar tower. Solar plants without collectors, which are arranged in planar form, are also suitable in particular for heating a heat transfer medium to 110-130° C.

It is basically possible for the solar heat from the solar array 33 to be discharged directly via the heat exchanger 32, as shown in FIG. 1. If heat transfer oil is used as heat transfer medium in the solar circuit 30, the heat transfer oil flows through the heat exchanger 32 at the primary side. It is however also conceivable, as per FIG. 2, for an intermediate circuit 36 which contains a further heat exchanger 37 and a dedicated pump 35 to be connected between the solar array 33 and the heat exchanger 32 situated in the fuel feed line 34. Water or steam may be used as heat transfer medium in the intermediate circuit 36. If, during times with little or no solar radiation, solar heat from the solar array 33 is stored and held available in an associated heat store (for example a salt store) 38 (dashed loop in FIG. 2), the preheating of the fuel by means of solar heat can be maintained continuously.

The invention claimed is:

1. A method for increasing the efficiency of a power plant which is equipped with a gas turbine, the method comprising:
   generating solar heat in a solar array;
   transferring the solar heat generated in the solar array to an intermediate circuit with a second heat exchanger through a second heat transfer medium;
   transferring the heat from the intermediate circuit with the second heat exchanger through the second heat transfer medium to a first heat exchanger and a first heat transfer medium; and
   transferring the heat from the first heat exchanger and the first heat transfer medium to heat the fuel being supplied to the gas turbine by use of solar heat.

2. The method as claimed in claim 1, characterized in that, for the transfer of the solar heat to the fuel, water is heated by means of the solar heat.

3. The method as claimed in claim 1, characterized in that, for the transfer of the solar heat to the fuel, steam is generated by means of the solar heat.

4. The method as claimed in claim 1, characterized in that, for the transfer of the solar heat to the fuel, oil is heated by means of the solar heat.

5. The method as claimed in claim 1, characterized in that natural gas is used as fuel, and in that the natural gas is preheated from 50° C. to 150° C. by means of the solar heat.

6. The method as claimed in claim 5, characterized in that the natural gas is preheated from 150° C. to 250° C. by means of the solar heat.

7. A power plant for carrying out a method, the power plan comprising:
- a gas turbine with a compressor for compressing combustion air;
- a combustion chamber in which hot gas is generated by the combustion of a fuel by means of the compressed combustion air;
- a turbine in which the hot gas generated is expanded, performing work;
- an intermediate circuit with a second heat exchanger through a second heat transfer medium connected to a source for solar heat, the source for the solar heat being a solar array; and
- a first heat exchanger and a first heat transfer medium to heat the fuel being supplied to the gas turbine by use of solar heat from the heat received from the intermediate circuit with the second heat exchanger through the second heat transfer medium.

8. The power plant as claimed in claim 7, characterized in that the solar array comprises parabolic trough collectors, Fresnel elements or a heliostat installation.

9. The power plant as claimed in claim 7, characterized in that the source for the solar heat comprises a heat store for solar heat.

10. The power plant as claimed in claim 9, characterized in that the medium which transports solar heat is water or steam or oil.

11. The power plant as claimed in claim 7, characterized in that the gas turbine is in the form of a sequential-combustion gas turbine with two combustion chambers and two turbines, and in that the fuel for both combustion chambers is preheated by means of solar heat.

12. The power plant as claimed in claim 7, characterized in that the gas turbine is part of a combined cycle power plant which comprises a water/steam circuit.

* * * * *

UNITED STATES PATENT AND TRADEMARK OFFICE
CERTIFICATE OF CORRECTION

PATENT NO. : 8,584,465 B2  
APPLICATION NO. : 13/632207  
DATED : November 19, 2013  
INVENTOR(S) : Richard Carroni et al.

Page 1 of 1

It is certified that error appears in the above-identified patent and that said Letters Patent is hereby corrected as shown below:

In the Specification

In column 1, line 12, delete "Mar. 3, 2011" and insert -- Mar. 29, 2011 --, therefor.

In the Claims

In column 5, line 7, claim 7, delete "the power plan" and insert -- the power plant --, therefor.

Signed and Sealed this
Twenty-fourth Day of June, 2014

Michelle K. Lee
*Deputy Director of the United States Patent and Trademark Office*